(12) United States Patent
Singh et al.

(10) Patent No.: US 8,756,345 B2
(45) Date of Patent: Jun. 17, 2014

(54) METHODS AND STRUCTURE FOR MANAGING PROTECTION INFORMATION WITH A SERIAL ATTACHED SCSI EXPANDER

(71) Applicant: LSI Corporation, Milpitas, CA (US)

(72) Inventors: Rajendra Singh, Howrah (IN); Sourin Sarkar, Bangalore (IN)

(73) Assignee: LSI Corporation, Milpitas, CA (US)

( * ) Notice: Subject to any disclaimer, the term of this patent is extended or adjusted under 35 U.S.C. 154(b) by 25 days.

(21) Appl. No.: 13/665,098

(22) Filed: Oct. 31, 2012

(65) Prior Publication Data

US 2014/0122745 A1    May 1, 2014

(51) Int. Cl.
*G06F 3/00* (2006.01)
*G06F 13/00* (2006.01)

(52) U.S. Cl.
USPC ............. 710/2; 710/5; 710/8; 710/11; 710/15

(58) Field of Classification Search
None
See application file for complete search history.

(56) References Cited

U.S. PATENT DOCUMENTS

| | | | |
|---|---|---|---|
| 4,156,798 A | 5/1979 | Doelz | |
| 5,335,227 A | 8/1994 | Smith | |
| 5,579,480 A | 11/1996 | Cidon | |
| 6,096,116 A | 8/2000 | Huff et al. | |
| 6,199,137 B1 | 3/2001 | Aguilar | |
| 6,301,642 B1 | 10/2001 | Jones et al. | |
| 6,611,863 B1 | 8/2003 | Banginwar | |
| 7,650,446 B2 | 1/2010 | Nonaka et al. | |
| 7,738,366 B2 | 6/2010 | Uddenberg | |
| 7,912,992 B2 | 3/2011 | Suzuki | |
| 2002/0046566 A1 | 4/2002 | Liao | |
| 2003/0076788 A1 | 4/2003 | Grabauskas et al. | |
| 2003/0097438 A1 | 5/2003 | Bearden | |
| 2003/0217212 A1 | 11/2003 | Kim | |
| 2004/0205288 A1 | 10/2004 | Ghaffari | |
| 2005/0015532 A1 | 1/2005 | Beckett | |
| 2005/0066100 A1 | 3/2005 | Elliott | |
| 2005/0080881 A1 | 4/2005 | Voorhees | |
| 2006/0101171 A1 | 5/2006 | Grieff | |
| 2006/0156055 A1 | 7/2006 | Cherian | |
| 2007/0220204 A1 | 9/2007 | Nakajima | |
| 2007/0226415 A1 | 9/2007 | Holland | |
| 2008/0189723 A1 | 8/2008 | Elliott | |
| 2009/0094620 A1 | 4/2009 | Kalwitz | |
| 2011/0145452 A1 | 6/2011 | Schilling | |
| 2012/0084486 A1 | 4/2012 | Jinno | |
| 2012/0144082 A1 | 6/2012 | Romero | |

OTHER PUBLICATIONS

IBM SAS RAID Controller Module, Installation and user guide v2, © Copyright IBM Corp. 2008, 2009.

(Continued)

*Primary Examiner* — Scott Sun
(74) *Attorney, Agent, or Firm* — Duft Bornsen & Fettig (57) ABSTRACT

Methods and structure are provided for managing Protection Information (PI) in a Serial Attached SCSI (SAS) expander. The Serial Attached SCSI (SAS) expander comprises a Serial Management Protocol (SMP) target. The SMP target is operable to receive, from a Redundant Array of Inexpensive Disks (RAID) controller, an SMP command for managing Protection Information (PI) for a RAID volume at the SAS expander. The expander further comprises a control unit operable to generate PI for the RAID volume in response to receiving the SMP command from the controller, and a Serial SCSI Protocol (SSP) initiator operable to generate SSP commands for writing the PI to a storage device that provisions the RAID volume based upon input from the control unit.

20 Claims, 6 Drawing Sheets

(56) References Cited

OTHER PUBLICATIONS

Intel® RAID Expander RES2SV240, Product Brief.
Nested RAID levels, wikipedia, downloaded on Oct. 8, 2012.
U.S. Appl. No. 13/096,404, "Remote Execution of RAID in Large Topologies," filed Apr. 28, 2011.
U.S. Appl. No. 13/171,922, "Methods and Apparatus for Increasing Storage Network Perfromance by Managing a Logical Volume in a Storage Network Switching Component," filed Jun. 29, 2011.
U.S. Appl. No. 13/281,301, " Methods and Systems Using Solid-State Drives as Storage Controller Cache Memory ," filed Oct. 25, 2011.
U.S. Appl. No. 13/365,050, "Methods and Structure for an Improved Solid-State Drive for Use in Caching Applications," filed Feb. 2, 2012.

METHODS AND STRUCTURE FOR MANAGING PROTECTION INFORMATION WITH A SERIAL ATTACHED SCSI EXPANDER

BACKGROUND

1. Field of the Invention

The invention relates generally to Serial Attached SCSI (SAS) domains and more specifically relates to enhanced SAS expanders.

2. Discussion of Related Art

In SAS domains (i.e., electronic systems implementing a switched SAS fabric), it is common for a Redundant Array of Independent Disks (RAID) controller to manage a large number of RAID logical volumes. RAID volumes offer benefits over other logical volumes because RAID volumes provide striped data for enhanced performance, and may also provide redundancy information for data to enhance reliability.

SAS storage devices that provision RAID logical volumes may be coupled for communication with the RAID controller via one or more SAS expanders. The SAS expanders route commands from the RAID controller to the appropriate storage devices.

When a RAID controller manages a RAID volume, common tasks may include managing input and output (I/O) commands directed to the volume, performing consistency checks on the volume, etc. These various tasks may further include maintaining Protection Information (PI) such as Data Integrity Fields (DIFs) at the RAID volume. PI is used to determine whether the data retrieved from a RAID volume matches the data that was originally stored on the devices that provision the RAID volume. For example, PI may exist in the form of a DIF that is updated every time a corresponding block of the RAID volume is modified. Then, when the block is read by the RAID controller, the RAID controller (and/or the storage device) may check the DIF. For example, the RAID controller may check a GUARD field of the DIF, while the storage device may check a reference tag and application tag of the DIF to ensure validity of the data. If there is a mismatch, the RAID controller may determine that there was an error in reading the block or the DIF, or may determine that the block or the DIF is corrupted.

The standards for PI and DIF data are laid out by the T10 committee in the End-to-End Data Protection Justification document, such the one issued by the T10 committee on Jul. 1, 2003 (T10/03-224r0), herein incorporated by reference.

Maintaining PI for a RAID volume takes up substantial amounts of processing power at the controller, because the controller generates and transmits a vast number of I/O commands to various storage devices as it generates the PI information. This problem is amplified when a RAID volume is first defined and initialized, as the controller may generate PI for each and every block of the RAID volume in order to initialize the volume. Thus, there may be a command directed from the RAID controller to each and every block of the RAID volume (e.g., hundreds of thousands, if not millions of commands). This is undesirable because this occupies processing resources at the RAID controller that could otherwise be used to process host I/O. Furthermore, generating and maintaining PI for a RAID volume can reduce the available bandwidth of the entire SAS domain, because communication channels between the controller and the expanders that route PI I/O to the appropriate storage devices may be occupied. This precludes other connections that would use the same pathways through the SAS expanders.

Thus it is an ongoing challenge to enhance the performance of a RAID controller in regard to RAID Protection Information (PI).

SUMMARY

The present invention addresses the above and other problems, thereby advancing the state of the useful arts, by providing methods and structure for a RAID controller to offload the generation and/or management of Protection Information (PI) to a SAS expander. For example, when a volume is initialized, a SAS expander may generate and direct input and/or output (I/O) in order to generate PI for each block of the RAID volume. This frees the RAID controller to process host I/O as desired, meaning that the initialization will not interfere with host I/O directed to other volumes.

In one aspect hereof, a method is provided for operating a Serial Attached SCSI (SAS) expander. The method comprises receiving, at a Serial Management Protocol (SMP) target of the SAS expander, an SMP command from a Redundant Array of Inexpensive Disks (RAID) controller requesting that the SAS expander manage Protection Information (PI) for a RAID volume. The method further includes generating, via a control unit of the SAS expander, PI for the RAID volume in response to receiving the SMP command from the controller, and generating, at a Serial SCSI Protocol (SSP) initiator, SSP commands for writing the PI to a storage device that provisions the RAID volume, based upon input from the control unit.

Another aspect hereof provides a Serial Attached SCSI (SAS) expander comprising a Serial Management Protocol (SMP) target. The SMP target is operable to receive, from a Redundant Array of Inexpensive Disks (RAID) controller, an SMP command for managing Protection Information (PI) for a RAID volume at the SAS expander. The expander further comprises a control unit operable to generate PI for the RAID volume in response to receiving the SMP command from the controller, and a Serial SCSI Protocol (SSP) initiator operable to generate SSP commands for writing the PI to a storage device that provisions the RAID volume based upon input from the control unit.

Another aspect hereof provides a non-transitory computer readable medium embodying programmed instructions which, when executed by a processor, are operable for performing a method for operating a Serial Attached SCSI (SAS) expander. The method comprises receiving, at a Serial Management Protocol (SMP) target of the SAS expander, an SMP command from a Redundant Array of Inexpensive Disks (RAID) controller requesting that the SAS expander manage Protection Information (PI) for a RAID volume. The method further includes generating, via a control unit of the SAS expander, PI for the RAID volume in response to receiving the SMP command from the controller, and generating, at a Serial SCSI Protocol (SSP) initiator, SSP commands for writing the PI to a storage device that provisions the RAID volume, based upon input from the control unit.

Other exemplary embodiments (e.g., methods and computer-readable media relating to the foregoing embodiments) may be described below.

DETAILED DESCRIPTION OF THE DRAWINGS

Figure 1:
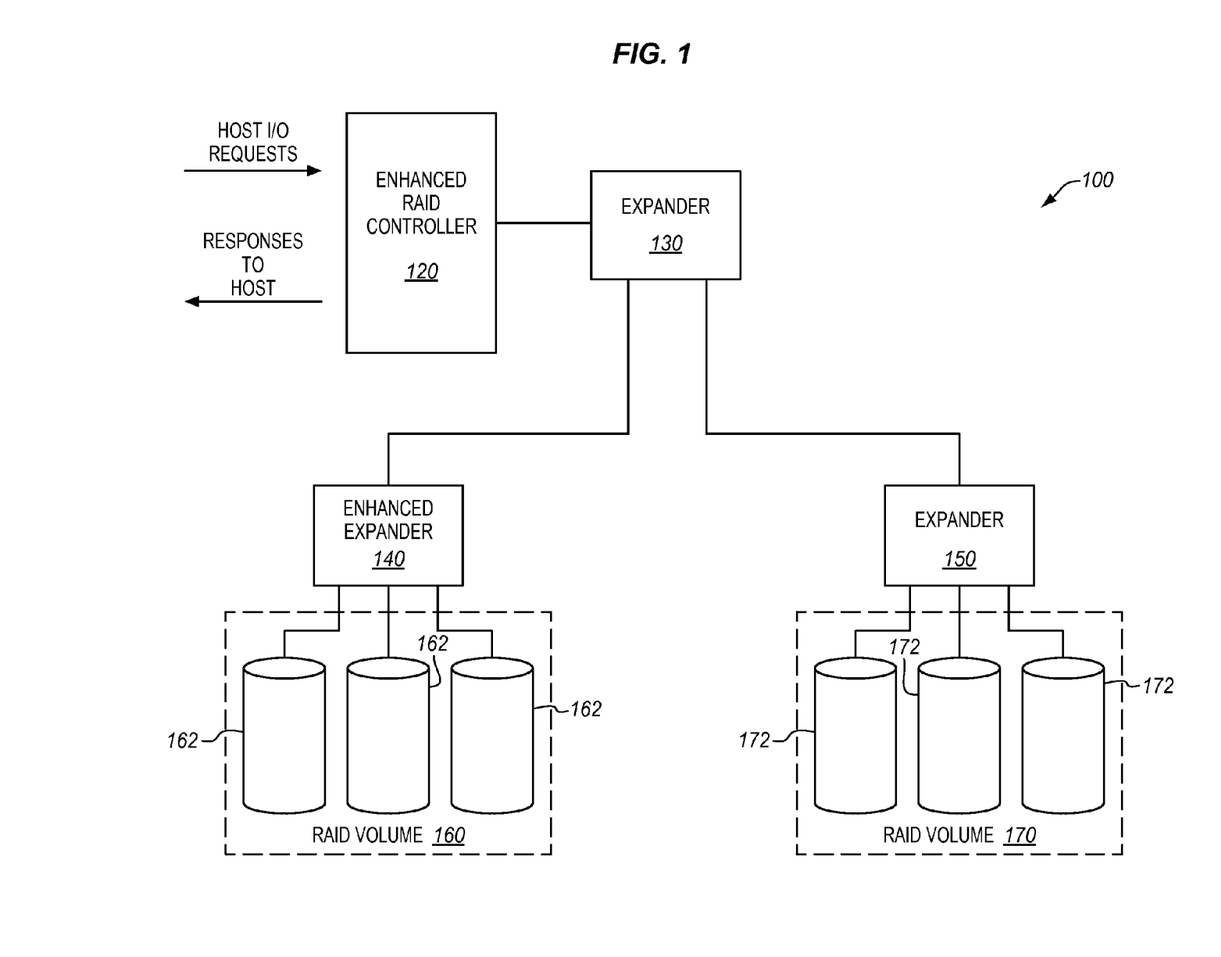
FIG. 1 is a block diagram of an exemplary SAS domain in accordance with features and aspects hereof.

FIG. 1 is a block diagram of an exemplary Serial Attached SCSI (SAS) domain 100 in accordance with features and aspects hereof In this embodiment, SAS domain 100 includes enhanced Redundant Array of Independent Disks (RAID) controller 120 and enhanced expander 140. RAID controller 120 has been enhanced to generate Serial Management Protocol (SMP) commands to trigger a SAS expander 140 to manage Protection Information (PI) for a RAID volume. Further details about PI are described, for example, at the SCSI Block Commands (SBC) 3 specification, revision 22, issued by the T10 committee on 29 Mar. 2010, and herein incorporated by reference.

Expander 140 has been enhanced to generate, transmit, and manage various Input/Output (I/O) commands pertaining to the management of PI in response to receiving the SMP command. This frees processing resources on RAID controller 120 and enables RAID controller 120 to direct those resources to manage host I/O.

In this embodiment, SAS domain 100 receives I/O from a host. The host I/O includes data to be read from and/or written to RAID volumes 160 and 170, which are managed by RAID controller 120. The host may comprise any suitable system capable of performing processing operations upon stored data (e.g., a server, general purpose computer, etc.).

Enhanced RAID controller 120 is a SAS compliant component that manages one or more RAID volumes, and is operable to process incoming host I/O directed to the RAID volumes that it manages. In this embodiment, RAID controller 120 manages RAID volumes 160 and 170. RAID controller 120 is operable to offload operations for managing PI at one or more of its RAID volumes to enhanced expander 140. RAID controller 120 may start this process by generating an SMP command requesting that SAS expander 140 perform PI data initialization for the volume. RAID controller 120 may be implemented, for example, as custom circuitry, as a special or general purpose processor executing programmed instructions stored in an associated program memory, or some combination thereof RAID controller 120 may comprise an independent SAS device, a Host Bus Adapter (HBA) of a host, an integrated component of a host, etc.

Expanders 130 and 150 comprise SAS expanders that are capable of routing commands between RAID controller 120 and the storage devices that provision RAID volumes managed by RAID controller 120. For example, expander 130 may establish connections from RAID controller 120 to expander 150 or expander 140, while expander 150 may manage connections between expander 130 and storage devices 172. Similarly, expander 140 may manage connections between expander 130 and storage devices 162.

Expander 140 performs similar operations to the expanders discussed above. Furthermore, in response to receiving an SMP command from RAID controller 120, expander 140 may generate Serial SCSI Protocol (SSP) I/O commands for generating and/or managing PI for a RAID volume (e.g., RAID volume 160). This may involve initializing PI for the RAID volume, performing a consistency check on the volume based on PI in the volume, validating data read from the volume based on PI, etc. These SSP I/O commands may be directed to any storage devices that provision the RAID volume. Thus, the SSP commands may direct the operations of storage devices that are not directly coupled with expander 140. For example, the SSP I/O commands may be sent across one or more expanders before they reach their destinations.

The number, configuration, and type of expanders that form the switched fabric of SAS domain 100 may vary as a matter of design choice. For example, in one embodiment enhanced RAID controller 120 is directly coupled with enhanced expander 140. In further embodiments, a large and complex switched fabric (e.g., a SAS Service Delivery Subsystem (SDS)) may separate the components of SAS domain 100. In still further embodiments, any number of expanders and/or RAID controllers of SAS domain 100 may exhibit the enhanced features described herein.

RAID volumes 160 and 170 comprise allocated storage space and data provisioned on storage devices 162 and storage devices 172, respectively. The RAID volumes may be set up in any suitable RAID configuration (e.g., RAID 0, 1, 10, 5, 60, 1E, etc.). Each RAID volume may be provisioned on a greater or lesser number of storage devices as a matter of design choice. The storage devices need not be dedicated to one specific RAID volume, but may also store data for a number of other logical volumes. Still further, a RAID volume may be provisioned on multiple storage devices that are remotely located from each other on the SAS domain via one or more expanders.

Storage devices 162 and storage devices 172 provision the storage capacity of their respective RAID volumes, and may comprise any media and/or interfaces capable of storing and/or retrieving data in a computer-readable format. For example, the storage devices may comprise magnetic hard disks, solid state drives, optical media, etc. compliant with protocols for one or more of SAS, SATA, Fibre Channel, etc. The number of storage devices utilized by SAS domain 100 may vary as a matter of design choice.

Figure 2:
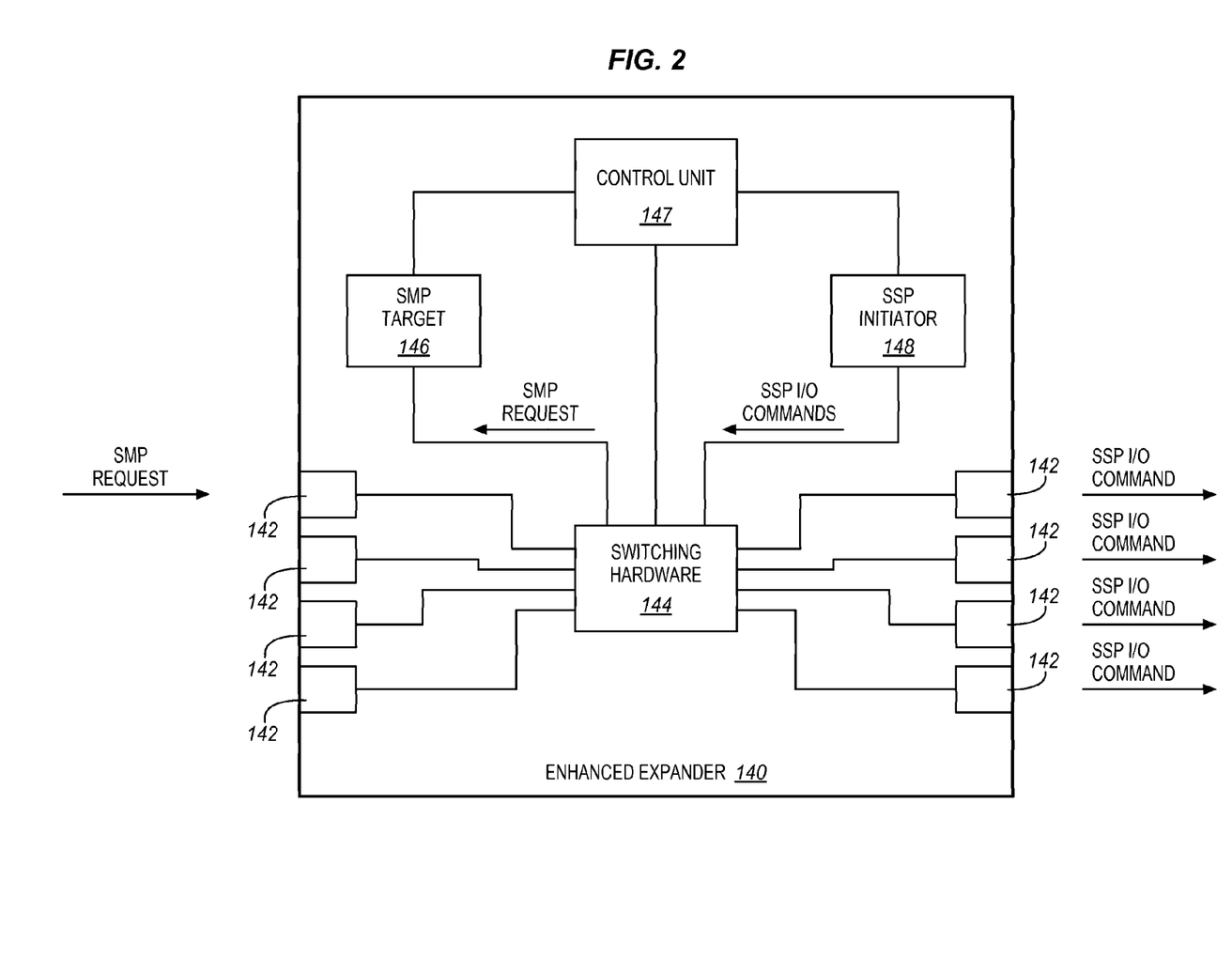
FIG. 2 is a block diagram of an exemplary SAS expander in accordance with features and aspects hereof.

FIG. 2 is a block diagram of an exemplary enhanced SAS expander 140 in accordance with features and aspects hereof According to FIG. 2, enhanced SAS expander 140 includes multiple SAS ports 142. Each SAS port 142 comprises one or more physical links with associated transceivers (PHYs). SAS expander 140 further includes switching hardware 144, which is operable to establish connections between various PHYs in order to enable communications between them. The operations of switching hardware 144 (e.g. a "crossbar" switch) are managed by control logic and hardware at expander 140, which in this embodiment is a component of control unit 147. Control unit 147 may be implemented, for example, as custom circuitry, as a special or general purpose processor executing programmed instructions stored in an associated program memory, or some combination thereof In one embodiment, control unit 147 includes an LSI Corporation End-to-End Data Protection (EEDP) circuit block.

Enhanced SAS expander 140 further includes SMP target 146 and SSP initiator 148. SMP target 146 receives incoming SMP commands from a host, and control unit 147 reviews the incoming SMP commands to determine whether to manage and/or generate PI at a RAID volume. Control unit 147 also directs the operations of SSP initiator 148, which generates SSP I/O commands sent to the storage devices that provision the RAID volume.

SMP target 146 may be integrated within expander 140 as an element of control unit 147, or may comprise an independent processing element of expander 140. In one embodiment, SMP target 146 is associated with a SAS address and therefore appears to other elements of SAS domain 100 as an end device coupled to expander 140. When incoming SMP commands directed to SMP target 146 are received at expander 140, they are forwarded to SMP target 146 by switching hardware 144 and/or control unit 147. SMP target 146 may then process the incoming SMP commands and provide them to control unit 147 for processing.

SSP initiator 148 may be integrated within expander 140 as an element of control unit 147, or may comprise an independent processing element within expander 140. In one embodiment, SSP initiator 148 is associated with a SAS address and appears to other elements of SAS domain 100 as an end device coupled to expander 140. Incoming SSP responses directed to SSP initiator 148 are received at expander 140, and are then forwarded to SSP initiator 148 by switching hardware 144 and/or control unit 147. SSP initiator 148 may then process the received data from the SSP commands and provide it to control unit 147.

Figure 3:
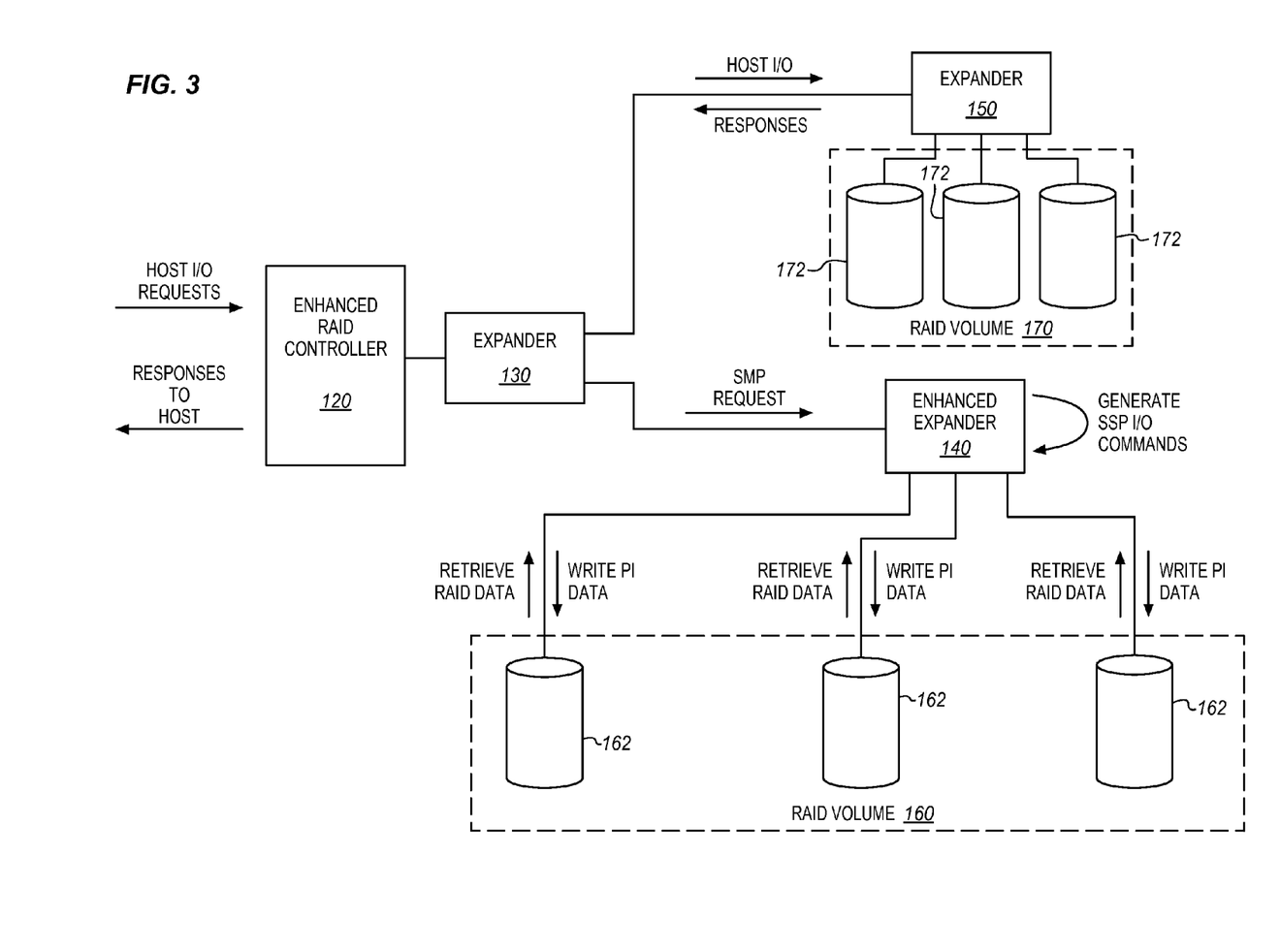
FIG. 3 is a block diagram of actions performed in an exemplary SAS domain in accordance with features and aspects hereof.

FIG. 3 is a block diagram of actions performed in an exemplary SAS domain in accordance with features and aspects hereof. FIG. 3 illustrates the operation of the various components of SAS domain 100 discussed above with respect to FIGS. 1-2. According to FIG. 3, RAID controller 120 starts to initialize RAID volume 160. As a part of this initialization process, RAID controller 120 issues an SMP request to an SMP target at enhanced expander 140. The SMP request indicates that enhanced expander should generate PI data for each block of the newly initialized RAID volume. The SMP commands may indicate the type and extent of PI data for enhanced expander 140 to generate and/or manage for a requested operation. In one embodiment, RAID controller 120 sends a reference tag seed (e.g., a starting reference tag number) and a generation rule (e.g., a rule for incrementing the reference tags). RAID controller 120 may further send an application tag seed and generation rule to the enhanced expander in the SMP request message.

Having received the SMP request, enhanced expander 140 proceeds to internally generate and issue SSP I/O commands that write PI data to the RAID volume, based on the existing contents of the RAID volume. Thus, enhanced expander 140 may program its circuits to automate the generation of PI data based on the rules and seeds received in the SMP request. For example, enhanced expander 140 may generate GUARD, Reference tag and Application tag fields based on the received SMP request. In one embodiment, enhanced expander 140 may send 32 byte Command Descriptor Block SCSI commands to a storage device after writing all of the requested PI data. Enhanced expander 140 may further respond to the SMP request with a vendor-specific SMP message indicating the status of the device.

While expander 140 is initializing the PI for RAID volume 160, RAID controller 120 may continue to manage host I/O directed to RAID volume 170, and may even track the progress of the initialization at the expander. Thus, in one embodiment, RAID controller 120 may manage host I/O directed to portions of RAID volume 160 that have recently been initialized with PI data. For example, RAID controller 120 may query expander 140 to determine a range of logical addresses that have been initialized, and may further process commands that are directed to the initialized range of logical addresses. RAID controller 120 may further discard or queue incoming commands directed to logical addresses that have not yet been initialized.

Thus, generating PI at expander 140 frees up processing resources at RAID controller 120. Initializing PI at expander 140 is independent of the processing of host I/O performed by RAID controller 120. Thus, the processing of the host I/O commands at RAID controller 120 does not delay the generation and/or verification of PI at expander 140, and the processing at expander 140 does not delay processing of the host I/O commands at RAID controller 120. This results in a processing benefit for the host, because I/O commands from the host are processed more quickly than they would be by prior systems. Furthermore, paths through expander 130 and expander 150 may remain available for other communications.

Note that the particular arrangement of components described herein is merely intended to be exemplary, and one of ordinary skill in the art will appreciate that the specific arrangement and configuration of SAS components is merely a matter of design choice.

Figure 4:
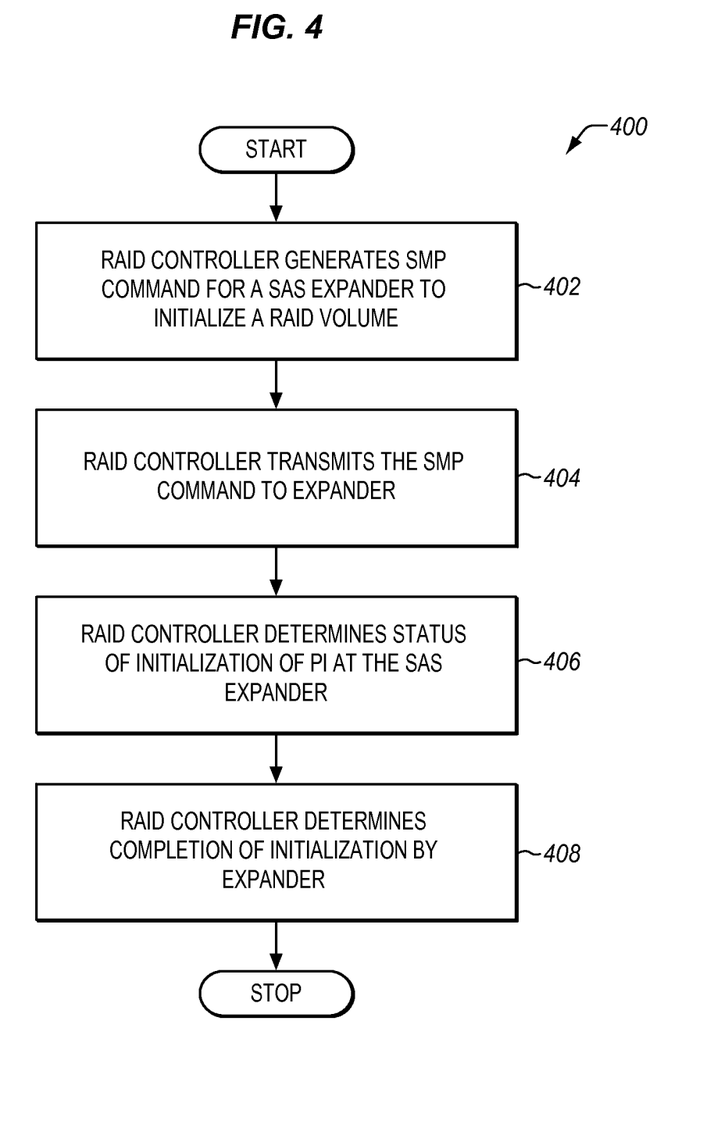
FIG. 4 is a flowchart illustrating a method in accordance with features and aspects hereof to oversee, via a RAID controller, initialization of a RAID volume in an exemplary embodiment.

FIG. 4 is a flowchart illustrating a method in accordance with features and aspects hereof to oversee, via a RAID controller, initialization of a RAID volume in an exemplary embodiment. The method of FIG. 4 may be operable in a SAS domain such as described above with regard to FIGS. 1-3. The steps of the flowcharts described herein are not all inclusive and may include other steps not shown. The steps described herein may also be performed in an alternative order.

Assume, for this embodiment, that the initialization of a RAID volume has been triggered by the RAID controller. Thus, the RAID controller allocates space on one or more storage devices in order to provision the volume.

In step 402, the RAID controller generates an SMP request for an expander to perform Protection Information (PI) data initialization for the RAID volume. The PI may comprise, for example, Data Integrity Fields (DIFs) or other data used for data validation. The SMP request may include data indicating the configuration of the RAID volume (e.g., the type of RAID implemented by the volume), as well as information indicating the portions of storage devices that have been allocated to provision the volume. Further, the SMP command may include information describing the type of PI to generate when initializing the volume (e.g., DIFs, etc.).

In step 404, the RAID controller transmits the SMP command to the expander for processing. At this time, the expander starts to initialize PI data for the RAID volume. This process will be discussed in further detail with regard to FIG. 5. During the initialization of PI for the volume, the RAID controller itself does not generate SSP I/O commands to generate the PI data. Thus, the RAID controller is free to process host I/O directed to different RAID volumes (or even portions of the RAID volume that have already been initialized with PI).

In step 406, the RAID controller determines the status of the initialization of PI at the RAID volume. For example, the RAID controller may send periodic SMP queries to the expander to check on the status of the process (i.e., to poll the expander to determine the progress of the initialization). In a further embodiment, the expander may be operable to automatically send an SMP completion message to the RAID controller when the PI has been initialized for the entire RAID volume.

In step 408, the RAID controller determines that the PI has been fully initialized for (i.e., generated and applied to) the RAID volume. Therefore, the RAID controller proceeds to utilize the RAID volume when managing host I/O. The RAID controller may further unlock the volume or otherwise make the volume available to other devices on the SAS domain.

Figure 5:
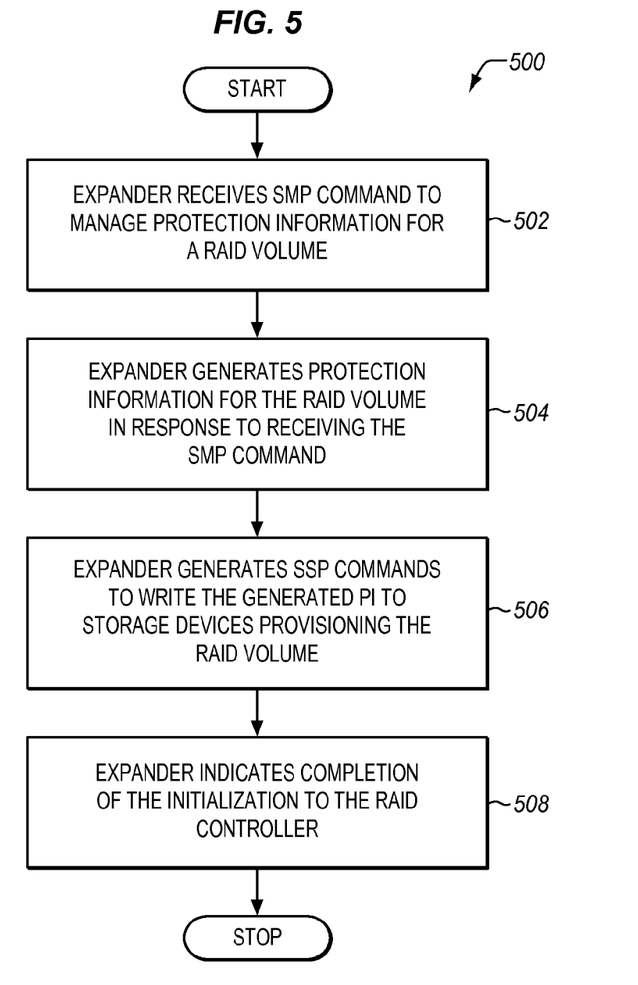
FIG. 5 is a flowchart illustrating a method in accordance with features and aspects hereof to actively perform, via a SAS expander, initialization of Protection Information (PI) for a RAID volume in an exemplary embodiment.

FIG. 5 is a flowchart illustrating a method in accordance with features and aspects hereof to actively perform, via a SAS expander, initialization of Protection Information (PI) for a RAID volume in an exemplary embodiment.

In step 502, the expander receives an SMP command from a RAID controller triggering (e.g., requesting) the initialization of PI for a RAID volume. The storage devices provisioning the RAID volume may be directly coupled to the expander, or may be coupled via one or more intermediate expanders in the SAS domain.

In step 504, a control unit of the expander generates protection information for the RAID volume, based on the received SMP command Protection information may be generated, for example, by generating SSP commands to read each block (e.g., a 512 byte block) that provisions the RAID volume, and by calculating a DIF for each block (e.g., an 8 byte DIF) that verifies the current data in the block. In embodiments where PI is being generated for an existing volume that already includes data, this may further include re-organizing the data to account for the new space occupied by the PI. In one example, 512 byte blocks are re-organized to each make room for 8 bytes of PI data.

In further embodiments, information may be stored in memory to associate a task identifier with the process (so that it can be distinguished from other PI data initializations for other volumes), to indicate the storage devices to perform the initialization process upon, to describe logical block addresses to generate PI for, etc. Some of this information may be provided in the received SMP command, while other information may be determined by querying the storage devices to acquire configuration information for the volumes that they provision.

In step 506, an SSP initiator of the expander generates SSP commands to write the generated PI to the storage devices that provision the RAID volume. In one embodiment, the SSP commands write the PI data to specially allocated locations within the RAID volume. In a further embodiment, PI data are written to the volume at locations that are proximate to the blocks that they verify.

During this process, the expander may update progress information in memory, and may periodically provide this information to the RAID controller that initiated the rebuild (e.g., in response to queries from the RAID controller). The progress information may indicate the percentage completion of the initialization of PI for the volume, locations in memory that have recently received PI, and other statistics. This may help the expander to resume the generation of PI if the process is halted for any reason.

In step 508, the expander indicates completion of the initialization to the RAID controller. For example, this may include the RAID controller initiating an SMP communication with the expander and receiving a response. In one embodiment, the expander may, of its own accord, send a vendor-specific SMP message to the RAID controller stating that the initialization has been successfully performed. The information included in such communications may indicate the location of progress information at the expander, may indicate that the initialization is complete, etc. Standards for SMP are defined in the Serial Attached SCSI standards, such as the SAS 2.0, Revision 16 standards, issued by the T10 committee on 18 Apr. 2009 and herein incorporated by reference.

In further embodiments, any suitable logical volume management tasks may additionally be performed by the SAS expander. For example, the SAS expander may be used to perform a consistency check of the RAID volume, to verify data integrity when routing host I/O, to perform a patrol read, a data scrub, a Make Data Consistent (MDC) operation, etc. In addition to these processes, the SAS expander may further read existing PI from the RAID volume, compare the PI with its associated data, and determine whether there is an inconsistency between these elements. If there is a discrepancy between the PI and its associated data, then these items may be flagged and reported to the SAS expander for further processing. This may free up further processing at the SAS expander.

Figure 6:
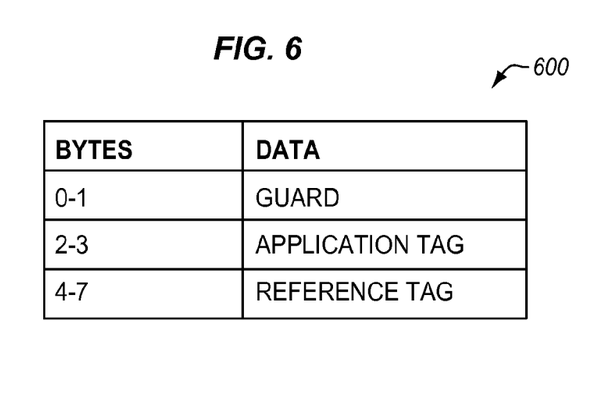
FIG. 6 is a block diagram illustrating an exemplary Protection Information (PI) field in accordance with features and aspects hereof.

FIG. 6 is a block diagram illustrating an exemplary Protection Information (PI) field in accordance with features and aspects hereof According to FIG. 6, the PI comprises a Data Integrity Field (DIF) that includes a two byte Logical Block Guard field, a two byte Application tag, and a four byte Reference tag. A Logical Block Guard field contains CRC (Cyclic Redundancy Check) data. The CRC data may be generated for the contents of a USER DATA field immediately preceding the Logical Block Guard field (i.e., the user data between the preceding logical block reference tag, if any, and the current logical block guard). The CRC data therefore may be used to check the data in the USER DATA field. A Reference tag is a unique number, such as an LBA number of the RAID volume (e.g., a Virtual LBA). When a read command is sent, it refers to the expected Reference tag value. The expected Reference tag value in the command should match with what was stored in the drive in a previous write command to the same LBA. In this way, added protection is provided to ensure that wrong data is not unintentionally accessed. An Application tag is used to place a guard on a range of LBAs. An Application tag mode page can indicate a set of application tags to be used for a set of LBAs.

Figure 7:
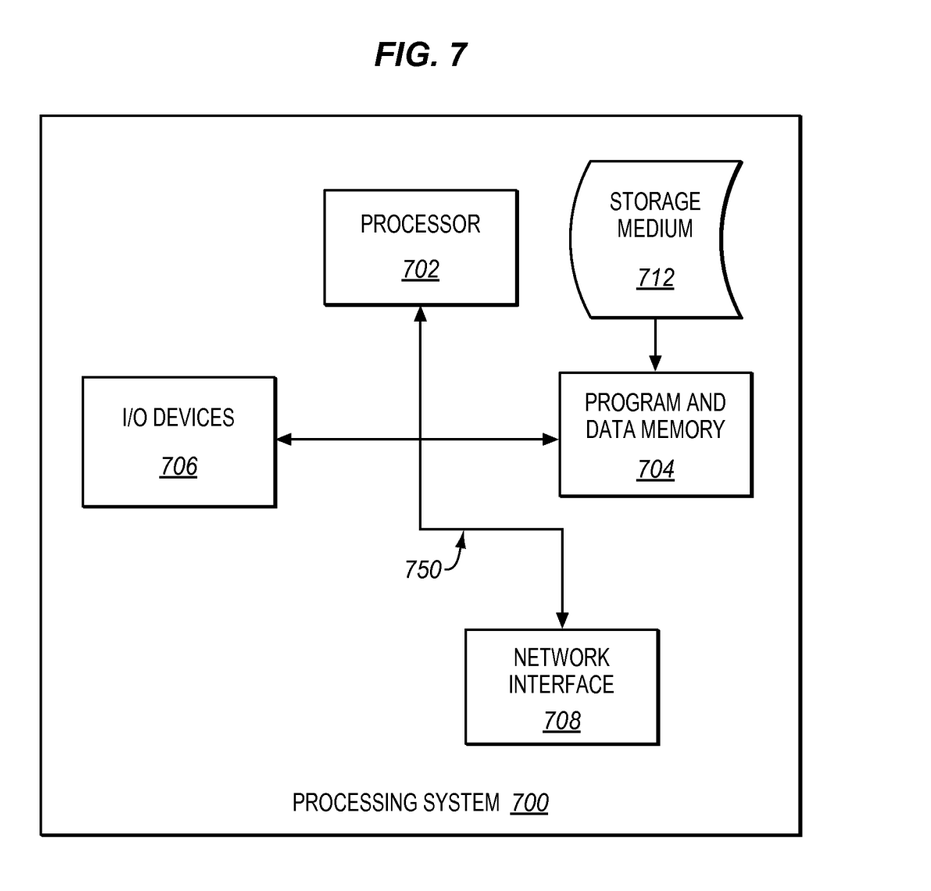
FIG. 7 illustrates an exemplary processing system operable to execute a computer readable medium embodying programmed instructions to perform desired functions in accordance with features and aspects hereof.

Embodiments disclosed herein can take the form of circuitry implementing software, the form of hardware or various combinations thereof. In one particular embodiment, software is used to direct a processing system of an enhanced SAS expander and/or RAID controller to perform the various operations disclosed herein. FIG. 7 illustrates a processing system 700 (such as in expander 140 of FIG. 1) operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (e.g., PHYs) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
a Serial Management Protocol (SMP) target operable to receive, from a Redundant Array of Inexpensive Disks (RAID) controller, an SMP command for managing Protection Information (PI) for a RAID volume at the SAS expander;
a control unit operable to generate PI for the RAID volume in response to receiving the SMP command from the controller; and
a Serial SCSI Protocol (SSP) initiator operable to generate SSP commands for writing the PI to a storage device that provisions the RAID volume based upon input from the control unit.

2. The expander of claim 1 wherein:
the protection information comprises a Data Integrity Field (DIF) generated for each block of the RAID volume.

3. The expander of claim 1 wherein:
the SMP command comprises a vendor-specific request to perform background PI initialization of the RAID volume.

4. The expander of claim 1 wherein:
the control unit of the expander is further operable to maintain progress information indicating the status of a background PI initialization, and to provide the progress information to the RAID controller.

5. The expander of claim 1 wherein:
the control unit is further operable to perform a consistency check by comparing the generated PI with data in the RAID volume.

6. The expander of claim 1 wherein:
the SAS expander is further operable to generate the PI independently of the RAID controller processing of host Input/Output (I/O) commands directed to another logical volume.

7. The expander of claim 6 wherein:
the processing of the host I/O commands at the RAID controller does not delay generation of PI at the expander, and the generation of PI at the expander does not delay processing of the host I/O commands at the RAID controller.

8. A method for operating a Serial Attached SCSI (SAS) expander comprising:
receiving, at a Serial Management Protocol (SMP) target of the SAS expander, an SMP command from a Redundant Array of Inexpensive Disks (RAID) controller requesting that the SAS expander manage Protection Information (PI) for a RAID volume;
generating, via a control unit of the SAS expander, PI for the RAID volume in response to receiving the SMP command from the controller; and
generating, at a Serial SCSI Protocol (SSP) initiator, SSP commands for writing the PI to a storage device that provisions the RAID volume, based upon input from the control unit.

9. The method of claim 8 wherein:
generating PI comprises generating a Data Integrity Field (DIF) for each block of the RAID volume.

10. The method of claim 8 wherein:
the SMP command comprises a vendor-specific request to perform background PI initialization of the RAID volume.

11. The method of claim 8 further comprising:
maintaining progress information at the expander indicating the status of a background PI initialization; and
providing the progress information to the RAID controller.

12. The method of claim 8 further comprising:
performing, via the expander, a consistency check by comparing the generated PI with data in the RAID volume.

13. The method of claim 8 further comprising:
generating the PI at the expander, independently of the RAID controller processing host Input/Output (I/O) commands directed to another logical volume.

14. The method of claim 13 wherein:
the processing of the host I/O commands at the RAID controller does not delay generation of PI at the expander, and the generation of PI at the expander does not delay processing of the host I/O commands at the RAID controller.

15. A non-transitory computer readable medium embodying programmed instructions which, when executed by a processor, are operable for performing a method for operating a Serial Attached SCSI (SAS) expander, the method comprising:
receiving, at a Serial Management Protocol (SMP) target of the SAS expander, an SMP command from a Redundant Array of Inexpensive Disks (RAID) controller requesting that the SAS expander manage Protection Information (PI) for a RAID volume;
generating, via a control unit of the SAS expander, PI for the RAID volume in response to receiving the SMP command from the controller; and
generating, at a Serial SCSI Protocol (SSP) initiator, SSP commands for writing the PI to a storage device that provisions the RAID volume, based upon input from the control unit.

16. The medium of claim 15 wherein:
generating PI comprises generating a Data Integrity Field (DIF) for each block of the RAID volume.

17. The medium of claim 15 wherein:
the SMP command comprises a vendor-specific request to perform background PI initialization of the RAID volume.

18. The medium of claim 15 wherein the method further comprises:
maintaining progress information at the expander indicating the status of a background PI initialization; and
providing the progress information to the RAID controller.

19. The medium of claim 15 wherein the method further comprises:
performing, via the expander, a consistency check by comparing the generated PI with data in the RAID volume.

20. The medium of claim 15 wherein the method further comprises:
generating the PI at the expander, independently of the RAID controller processing host Input/Output (I/O) commands directed to another logical volume.

* * * * *